(12) United States Patent
Yuki

(10) Patent No.: US 8,615,753 B2
(45) Date of Patent: Dec. 24, 2013

(54) DISTRIBUTION APPARATUS, METHOD AND SYSTEM FOR UPDATED VERSION OF FIRMWARE

(75) Inventor: Naoto Yuki, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 13/096,840

(22) Filed: Apr. 28, 2011

(65) Prior Publication Data

US 2011/0276956 A1 Nov. 10, 2011

(30) Foreign Application Priority Data

May 10, 2010 (JP) ................................. 2010-108634

(51) Int. Cl.
*G06F 9/445* (2006.01)
(52) U.S. Cl.
USPC ............................ 717/170; 717/168; 717/172
(58) Field of Classification Search
USPC ............................ 717/168–174; 709/203–204
See application file for complete search history.

(56) References Cited

U.S. PATENT DOCUMENTS

| 6,282,700 | B1 * | 8/2001 | Grover et al. ................. 717/170 |
| 6,832,373 | B2 * | 12/2004 | O'Neill .......................... 717/171 |
| 7,243,347 | B2 * | 7/2007 | Palmer et al. ................. 717/170 |
| 7,552,431 | B2 * | 6/2009 | Napier et al. ................. 717/169 |
| 7,562,358 | B2 * | 7/2009 | Bennett et al. ................ 717/170 |
| 7,657,884 | B2 * | 2/2010 | Okonnen et al. .............. 717/168 |
| 7,703,090 | B2 * | 4/2010 | Napier et al. ................. 717/168 |
| 7,734,690 | B2 * | 6/2010 | Moromisato et al. ......... 709/204 |
| 7,805,719 | B2 * | 9/2010 | O'Neill .......................... 717/168 |
| 7,823,147 | B2 * | 10/2010 | Moshir et al. ................. 717/173 |
| 7,953,901 | B2 * | 5/2011 | Nishikawa ...................... 710/8 |
| 7,984,435 | B2 * | 7/2011 | Kokkinen ...................... 717/170 |
| 8,151,256 | B2 * | 4/2012 | Ramannavar et al. ........ 717/168 |
| 8,166,101 | B2 * | 4/2012 | Shah ............................. 709/203 |
| 8,176,481 | B2 * | 5/2012 | Kasahara ...................... 717/168 |
| 8,225,304 | B2 * | 7/2012 | Shahindoust et al. ........ 717/172 |
| 8,307,173 | B2 * | 11/2012 | McKenney .................... 711/156 |
| 8,316,224 | B2 * | 11/2012 | Vidal et al. .................... 713/100 |

FOREIGN PATENT DOCUMENTS

JP 09-231083 A 9/1997

OTHER PUBLICATIONS

Anderson et al, "Generic Patch Inference", IEEE, pp. 337-346, 2008.*
Friedrich, "Meta-Data Version and Configuration Management in Multi-Vendor Environments", ACM, pp. 799-804, 2005.*
Hosek et al, "Safe Software Updates via Multi-version Execution"ACM, pp. 37-49, 2007.*
Neamtiu et al, "Contextual Effects for Version-Consistent Dynamic Software Updating and Safe Concurrent Programming", 37-49, 2007.*

* cited by examiner

*Primary Examiner* — Anil Khatri
(74) *Attorney, Agent, or Firm* — Canon USA, Inc., IP Division

(57) ABSTRACT

A distribution apparatus manages a distribution history of a program and, when a request about a program applicable to a device including device identification information and a version of the program of the device is received from the device, if an update result indicates successful updating in the distribution history about the program, transmits information indicating a post-update version included in the distribution history to the device as a response to the request.

6 Claims, 15 Drawing Sheets

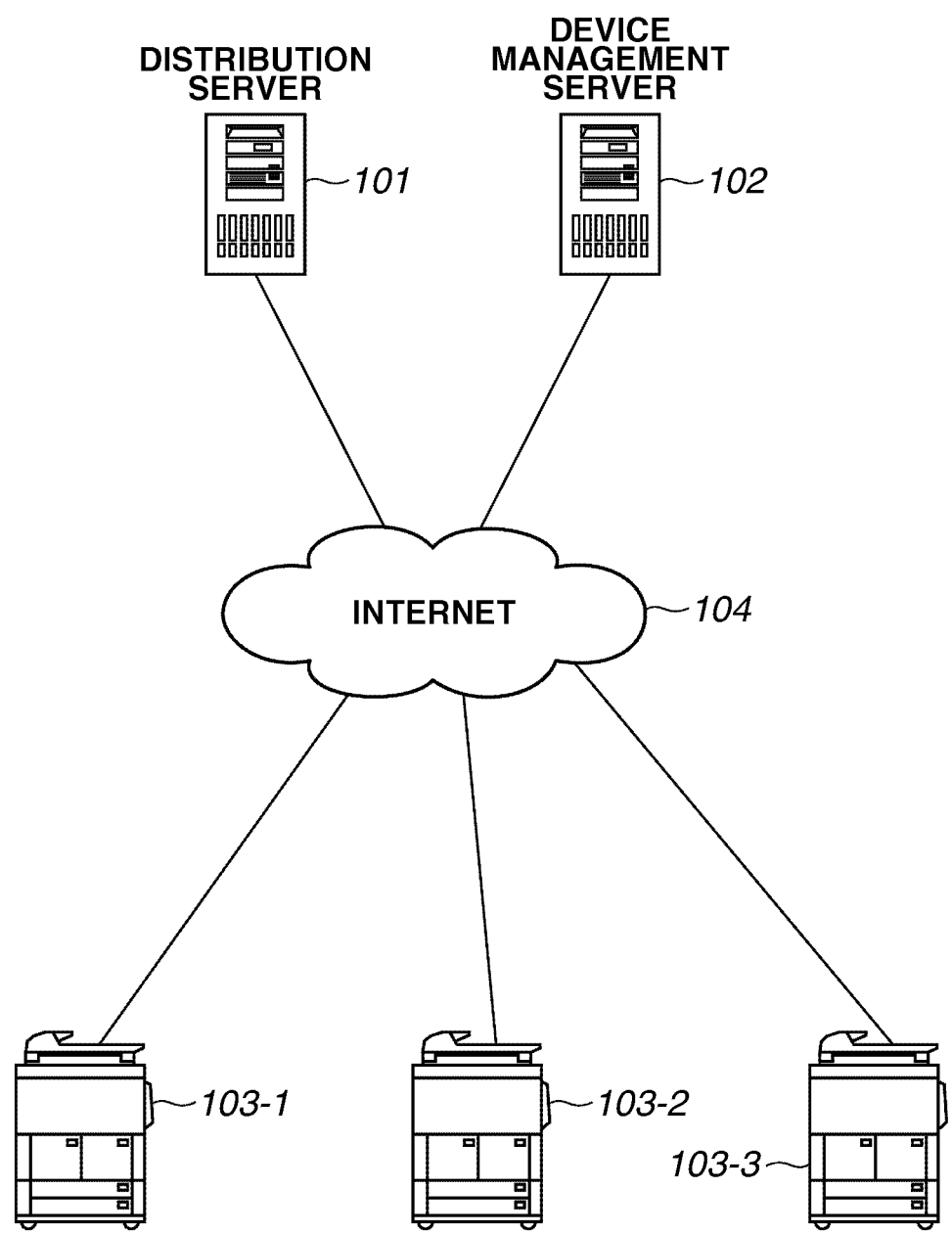

| ERROR No. | DEVICE No. | ERROR CODE | ERROR OCCURRENCE DATE AND TIME |
|---|---|---|---|
| 1 | AAA00001 | -2001 | 2009/10/20 20:13:01 |
| 2 | AAA00001 | -5003 | 2009/10/14 20:10:30 |
| 3 | BBB00002 | -5003 | 2009/10/10 09:13:01 |

FIG.10

| MODEL | DEVICE No. | PRE-UPDATE VERSION | POST-UPDATE VERSION |
|---|---|---|---|
| C7065 | AAA00000~AAA99999, BBB00000~BBB99999 | V1.0 | V1.1 |
| C7065 | AAA00000~AAA99999, BBB00000~BBB99999 | V1.0 | V1.2 |
| C7065 | AAA00000~AAA99999, BBB00000~BBB99999 | V1.1 | V1.2 |
| C7065 | AAA00000~AAA99999, BBB00000~BBB99999 | V1.0 | V1.3 |
| C7065 | AAA00000~AAA99999, BBB00000~BBB99999 | V1.2 | V1.3 |

FIG.11

| DISTRIBUTION DATE AND TIME | DEVICE No. | MODEL | PRE-UPDATE VERSION | POST-UPDATE VERSION | RESULT | DOCUMENT FEEDING UNIT | FAX BOARD | HARD DISK | ERROR CODE |
|---|---|---|---|---|---|---|---|---|---|
| 2009/10/26 14:59:03 | BBB00002 | C7065 | V1.2 | V1.3 | UNSUCCESSFUL | TRUE | FALSE | TRUE | -5003 |
| 2009/10/23 10:34:34 | AAA00002 | C7065 | V1.2 | V1.3 | SUCCESSFUL | TRUE | TRUE | TRUE | |
| 2009/10/21 20:13:01 | BBB00002 | C7065 | V1.0 | V1.2 | SUCCESSFUL | TRUE | FALSE | TRUE | -5003 |
| 2009/10/21 20:11:01 | AAA00002 | C7065 | V1.1 | V1.2 | SUCCESSFUL | TRUE | TRUE | TRUE | |
| 2009/10/21 20:10:30 | BBB00001 | C7065 | V1.0 | V1.1 | UNSUCCESSFUL | TRUE | FALSE | TRUE | |
| 2009/10/20 10:13:01 | AAA00002 | C7065 | V1.0 | V1.1 | SUCCESSFUL | TRUE | TRUE | TRUE | |
| 2009/10/20 09:30:01 | AAA00002 | C7065 | V1.0 | V1.3 | UNSUCCESSFUL | TRUE | TRUE | TRUE | |
| | | | | | | | | | |

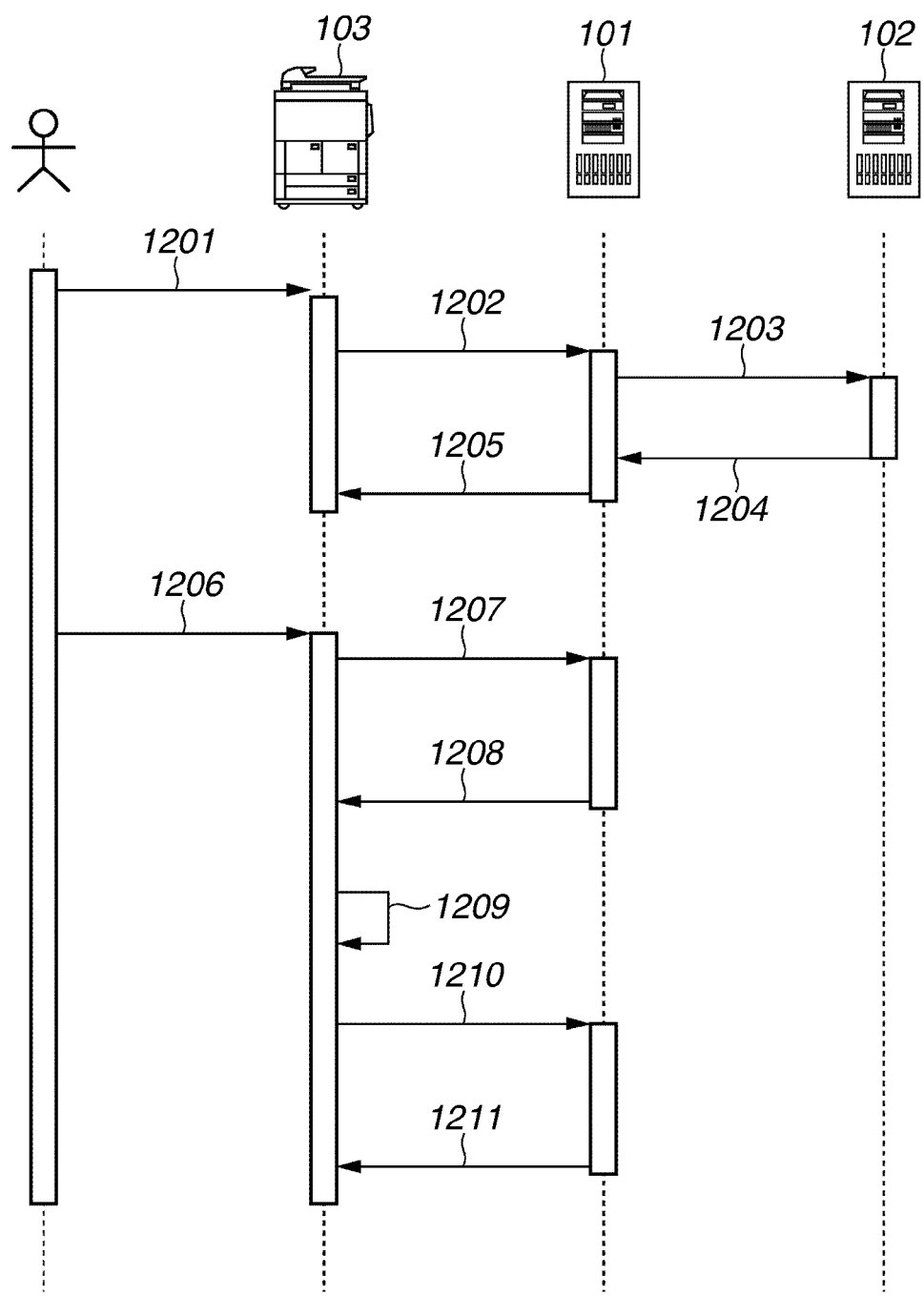

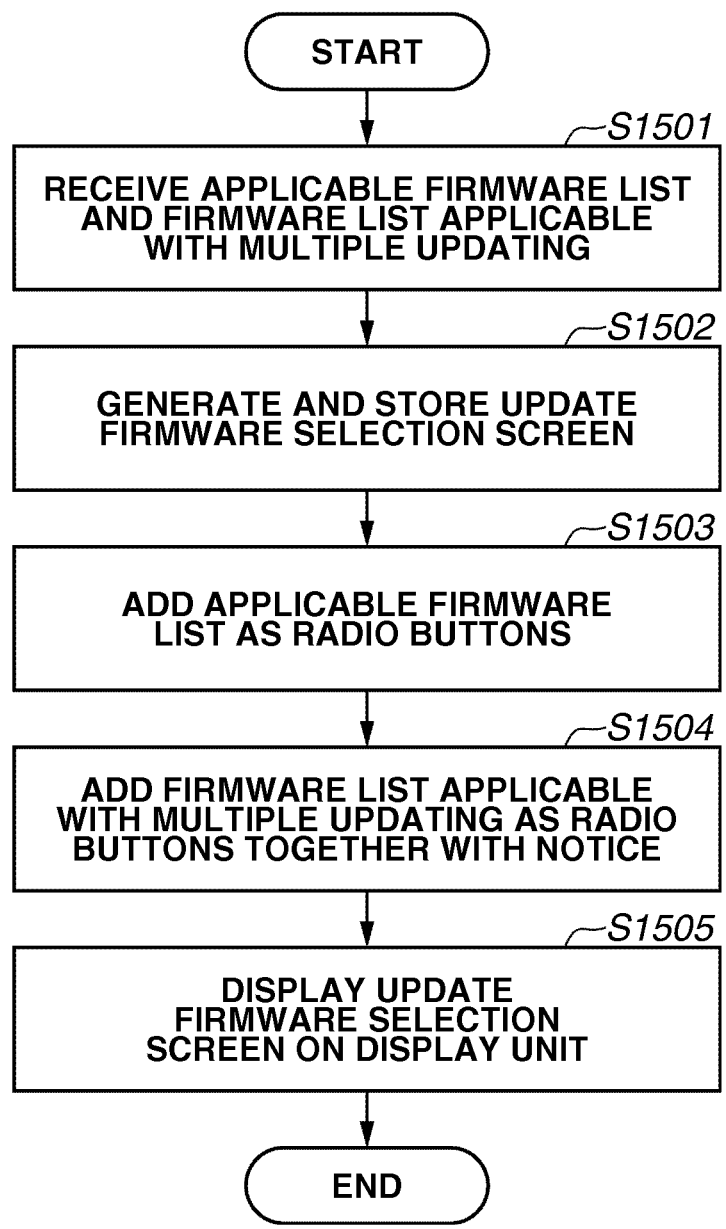

DISTRIBUTION APPARATUS, METHOD AND SYSTEM FOR UPDATED VERSION OF FIRMWARE

BACKGROUND OF THE INVENTION

1. Field of the Invention

The present invention relates to a technique for distributing a program.

2. Description of the Related Art

Recently, it has become possible to execute installation and/or updating of software via the Internet by standard use of an Internet environment and an improvement of an Internet speed. Accordingly, opportunities increase that the software is installed and/or updated.

However, the increase of the opportunities invites concern that problems of unsuccessful installation of the software is distributed to a target device because of a state of the device to be installed and an error in distribution setting tend to widely spread in the market. With respect to these concerns, Japanese Patent Application Laid-Open No. 09-231083 proposes a method for automatically restoring an environment when the installation of the software to be distributed is unsuccessful.

In the conventional technique, the environment is restored after the installation of the software becomes unsuccessful. However, in this case, the time taken in the distribution of the software comes to nothing. Specifically, large scale software requires an increased distribution time.

SUMMARY OF THE INVENTION

One aspect of the present invention is directed to effectively preventing devices becoming inoperative due to an unsuccessful installation and/or updating of software (i.e., a program) from spreading.

According to an aspect of the present invention, a distribution apparatus includes a holding unit configured to hold, in a storage device, association information associating model information for identifying a model of a device, device identification information for identifying the device, a pre-update version of a program distributable to the device, and a post-update version of a program distributable to the device, a history storage unit configured to store, in the storage device as a distribution history, the device identification information of the device to which a program was distributed, the pre-update version of the program of the device, aversion of the distributed program as the post-update version, and an update result indicating whether the updating with the distributed program in the device was successful, an identification unit configured to identify, from the storage device, when a request about a program applicable to the device including the device identification information and the version of the program of the device is received from the device, association information corresponding to the device identification information and the version of the program included in the request, a history identification unit configured to identify a distribution history corresponding to the device identification information, the pre-update version, and the post-update version included in the identified association information from the storage device, and a response unit configured to transmit, when the update result indicates successful updating in the identified distribution history, information indicating the post-update version included in the distribution history to the device as a response to the request.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates an example of a system configuration of a software distribution system according to an exemplary embodiment of the present invention.

FIG. 10 illustrates an example of a distribution firmware table storing distributable firmware information the distribution server stores.

FIG. 11 illustrates an example of a distribution history table storing a distribution history the distribution server stores.

FIG. 12 is a sequence diagram illustrating an example of processing in a case where the firmware is updated.

FIG. 15 is a flow chart illustrating an example of processing performed by the image forming apparatus when the image forming apparatus receives a response in step 1205 in FIG. 12.

DESCRIPTION OF THE EMBODIMENTS

Various exemplary embodiments, features, and aspects of the invention will be described in detail below with reference to the drawings.

FIG. 1 illustrates an example of a system configuration of a software distribution system (a program distribution system) according to an exemplary embodiment of the present invention.

FIG. 1 illustrates a state that a distribution server 101 for distributing software (i.e., a program) to image forming apparatuses, a device management server 102 for managing information of the image forming apparatuses, and the image forming apparatuses 103-1 through 103-3 are connected to each other via the Internet 104. In FIG. 1, three image forming apparatuses 103-1 through 103-3 are illustrated. However, any number of image forming apparatuses may be connected. Hereinafter, in a case where it is not necessary to distinct each of the image forming apparatuses, the image forming apparatus is simply referred to as the image forming apparatus 103.

Figure 2A:
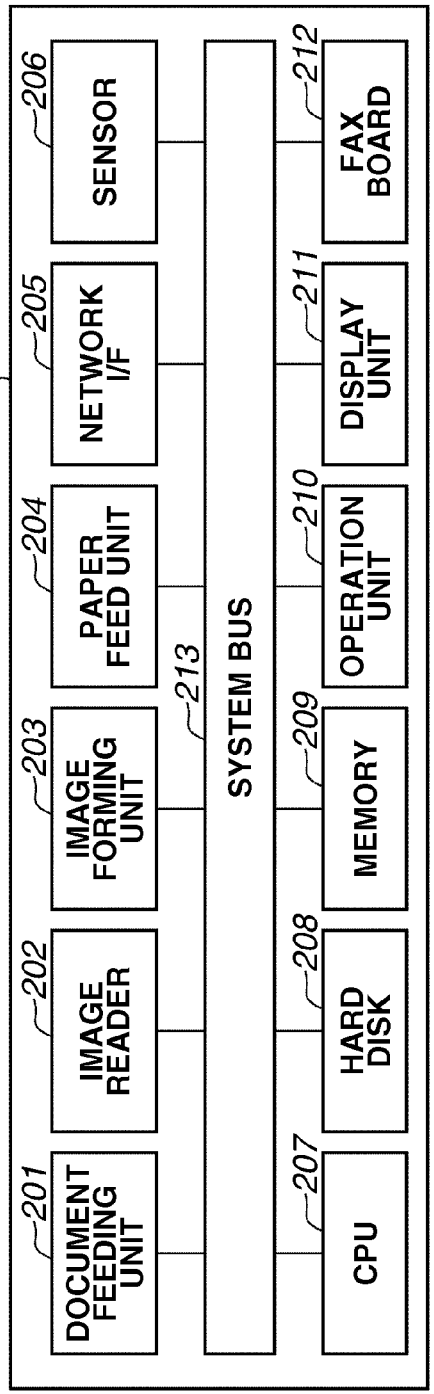
FIGS. 2A and 2B each illustrate an example of a hardware configuration of an image forming apparatus.
Figure 2B:
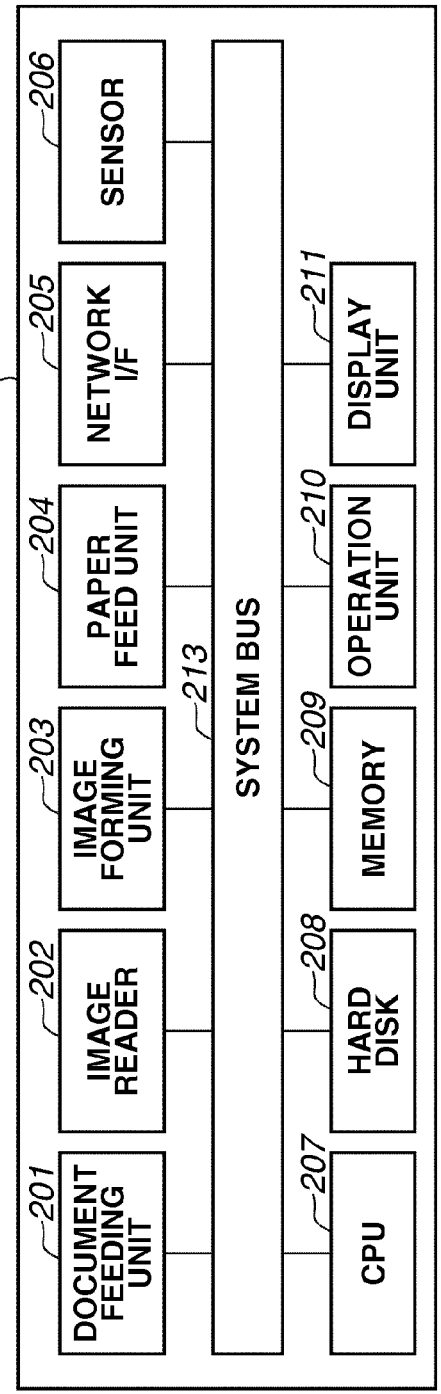

FIGS. 2A and 2B each illustrate an example of a hardware configuration of the image forming apparatus 103.

The image forming apparatus 103 includes the below described components 201 through 213.

A document feeding unit 201 automatically conveys a document to be read to an image reader 202. The image reader (i.e., a scanner) 202 reads the document. An image forming unit 203 converts the thus read document and received data into a print image and prints the print image. A paper feed unit 204 feeds paper for printing. A network interface (I/F) 205 connects the image forming apparatus 103 to a local area network (LAN) and the Internet via a network to allow an information exchange with an external apparatus. A sensor 206 senses a state of each of the components of the image forming apparatus 103. A CPU 207 controls each processing performed by the image forming apparatus 103. A hard disk 208 stores a program or data relating to each processing by the image forming apparatus 103. A memory 209 can electrically store temporal data relating to each processing by the image forming apparatus 103 and is also rewritable. An operation unit 210 accepts an instruction input into the image forming apparatus 103. A display unit 211 displays information relating to an operating condition of the image forming apparatus 103 and an operation with respect to the operation unit 210 of the image forming apparatus 103. A facsimile (FAX) board 212 provides a function for facsimile communication. A system bus 213 serves to connect the components 201 through 212 to each other so as to allow them for a data transmission.

The CPU 207 executes processing based on a program stored in the hard disk 208 or the like, thereby realizing a function of the image forming apparatus 103 and the below described processing executed by the image forming apparatus 103.

Upon selling an image forming apparatus, there is such a case that the image forming apparatus is not provided with unnecessary hardware depending on functions to be provided by the product. For example, it becomes unnecessary to provide the FAX board 212 in the product that does not require a facsimile function. Therefore, the image forming apparatus 103 providing the facsimile function has a hardware configuration with the FAX board 212 as illustrated in FIG. 2A. The image forming apparatus 103 that does not provide the facsimile function has a hardware configuration without the FAX board 212 as illustrated in FIG. 2B.

The hardware configuration with or without the FAX board 212 depending on necessity of the facsimile function is described above. However, the other hardware configuration may be employed in addition to the hardware configuration with or without the FAX board 212.

Figure 3:
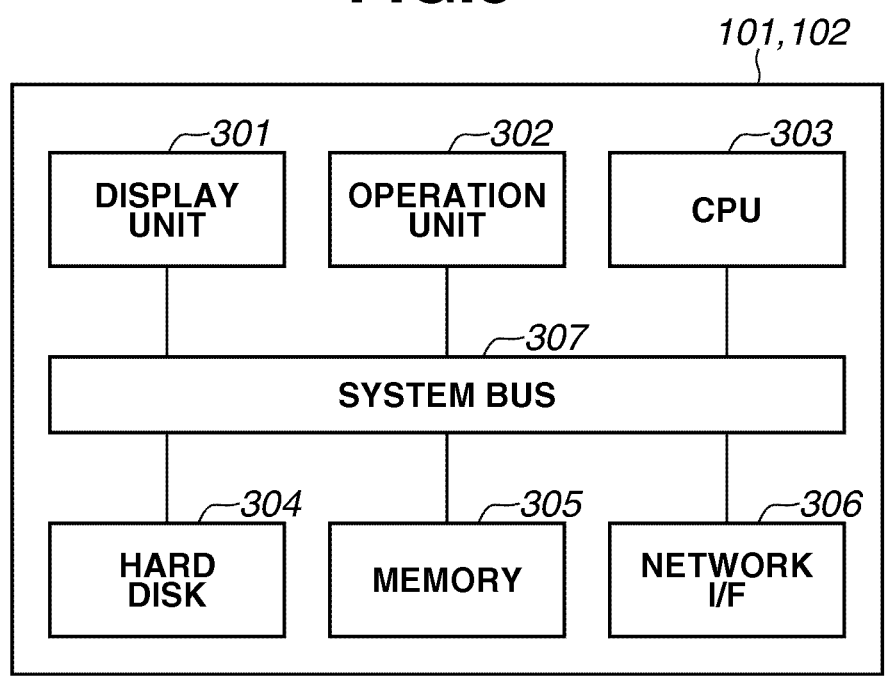
FIG. 3 illustrates an example of a hardware configuration of each of a distribution server and a device management server.

FIG. 3 illustrates an example of a hardware configuration of each of the distribution server 101 and the device management server 102.

The distribution server 101 and the device management server 102 each include the below described components 301 through 307.

A display unit 301 displays windows, icons, messages, menus, and other user interface information. An operation unit 302 accepts inputting from an end user via a keyboard or a mouse.

A CPU 303 controls each processing performed by the server. A hard disk 304 stores a program and data relating to each processing by the present server. A memory 305 can electrically store temporal data relating to each processing by the present server and is rewritable. A network I/F 306 connects the present server with a LAN or the Internet via a network to allow an information exchange with external devices. A system bus 307 connects the components 301 through 306 each other so as to allow a data transmission therebetween.

The CPU 303 of the distribution server 101 executes processing based on a program stored in the hard disk 304 or the like, thereby realizing a function of the distribution server 101 and the below described processing executed by the distribution server 101. Similarly, the CPU 303 of the device management server 102 executes processing based on the program stored in the hard disk 304 or the like, thereby realizing a function of the device management server 102 and the below described processing executed by the device management server 102.

Figure 4:
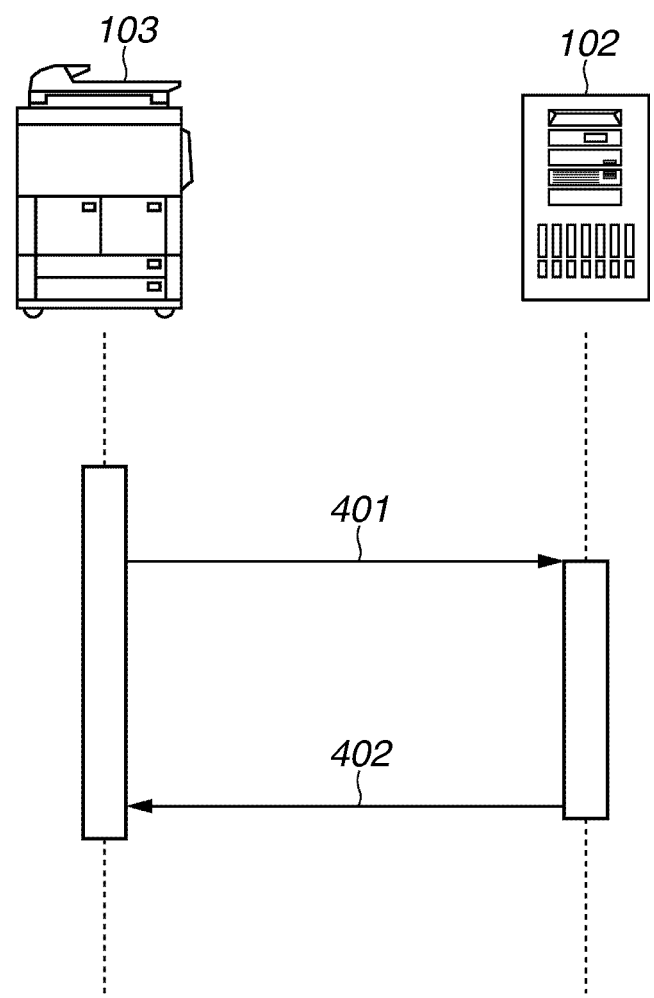
FIG. 4 is a sequence diagram illustrating an example of processing in which a device management server collects information of the image forming apparatus.

FIG. 4 is a sequence diagram illustrating an example of processing in which the device management server 102 collects information of the image forming apparatus 103. The image forming apparatus 103 starts processing of the sequence diagram of FIG. 4 at a predetermined timing. For example, the image forming apparatus 103 starts processing of the sequence diagram of FIG. 4 at intervals of once per hour or when an error occurs.

The image forming apparatus 103 transmits device information to the device management server 102 in step 401. The above-described device information includes hardware information of the device and information of an error (i.e., error information) in a case where the error occurs.

The device management server 102 stores the device information received in step 401 in the hard disk 304. Then, the device management server 102 notifies a registration result of the device information to the image forming apparatus 103 in step 402.

The image forming apparatus 103 brings the processing to an end upon receiving the registration result of the device information received in step 402.

Figure 5:
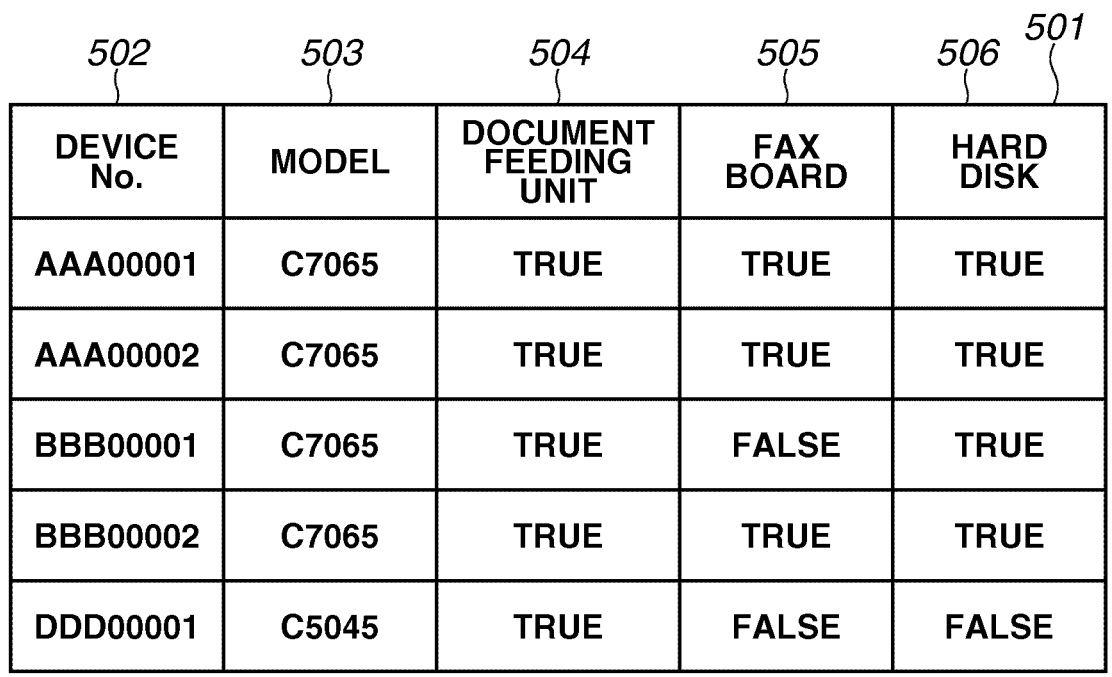
FIG. 5 illustrates an example of a table storing hardware information of the image forming apparatus, the hardware information being stored in a hard disk by the device management server.

FIG. 5 illustrates an example of a table storing a hardware configuration of the image forming apparatus 103 stored in the hard disk 304 by the device management server 102.

A hardware configuration table 501 stores the hardware configuration of the image forming apparatus 103.

A device number column 502 stores device numbers as identification data (i.e., ID) for uniquely identifying the image forming apparatus 103. The device number is an example of device identification information.

A model column 503 stores model information of the image forming apparatus 103.

A document feeding unit column 504 stores information about the presence or absence of the document feeding unit 201 of the image forming apparatus 103.

A FAX board column 505 stores information about the presence or absence of the FAX board 212 of the image forming apparatus 103.

A hard disk column 506 stores information about the presence or absence of the hard disk 208 of the image forming apparatus 103.

In the present exemplary embodiment, examples of the hardware configuration include three pieces of hardware 504 through 506. However, the hardware may have any other hardware configuration.

In the hardware configuration table 501, data is updated based on the device information received in the above-described step 401 by the device management server 102.

In the present exemplary embodiment, information indicated in a single row of the data illustrated in FIG. 5 is referred to as the hardware configuration. Information about the document feeding unit, the FAX board, the hard disk, or the like included in the hardware configuration is referred to as hardware information.

Figure 6:
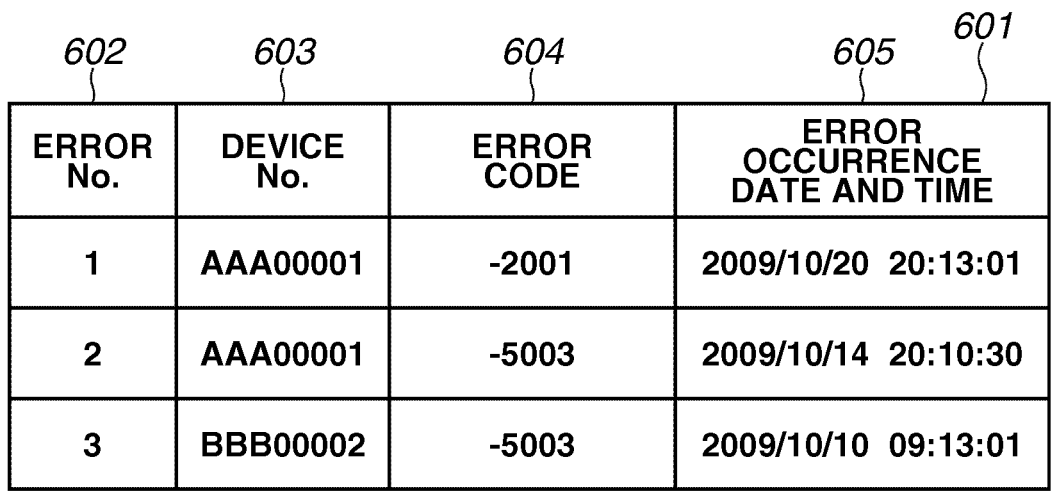
FIG. 6 illustrates an example of a table storing error information on errors having occurred in the image forming apparatus, the error information being stored in the hard disk by the device management server.

FIG. 6 illustrates an example of a table storing error information of errors having occurred in the image forming apparatus 103 and stored in the hard disk 304 by the device management server 102.

An error information table 601 stores the error information of errors having occurred in the image forming apparatus 103 and stored in the hard disk 304 by the device management server 102.

An error No. column 602 includes IDs for uniquely identifying error information of the error having occurred in the image forming apparatus 103.

An error occurred device number column 603 stores the device numbers of the image forming apparatus 103 in which errors were occurred.

An error code column 604 stores error codes of the errors having occurred.

An error occurrence date and time column 605 stores date and time when the error occurred.

In the error information table 601, data is updated based on the device information received in the above-described step 401 by the device management server 102.

Figure 7:
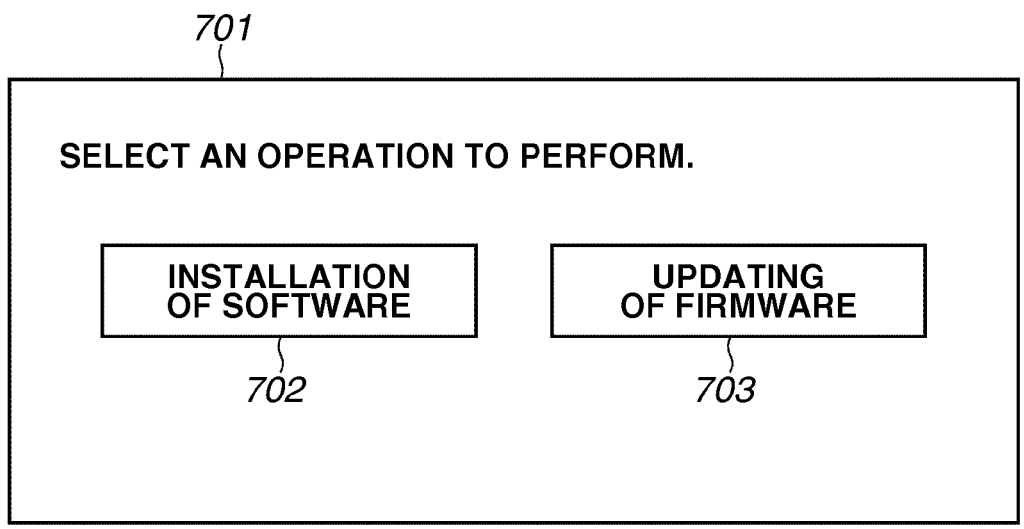
FIG. 7 illustrates an example of a software management screen for installing software and updating firmware.

FIG. 7 illustrates an example of a software management screen for installing software and updating firmware.

A software management screen 701 is an example of a screen displayed on the display unit 211 by the user operating the operation unit 210 of the image forming apparatus 103.

A software installation button 702 is a button through which the user instructs installation of the software.

A firmware updating button 703 is a button through which the user instructs updating of the firmware.

Figure 8:
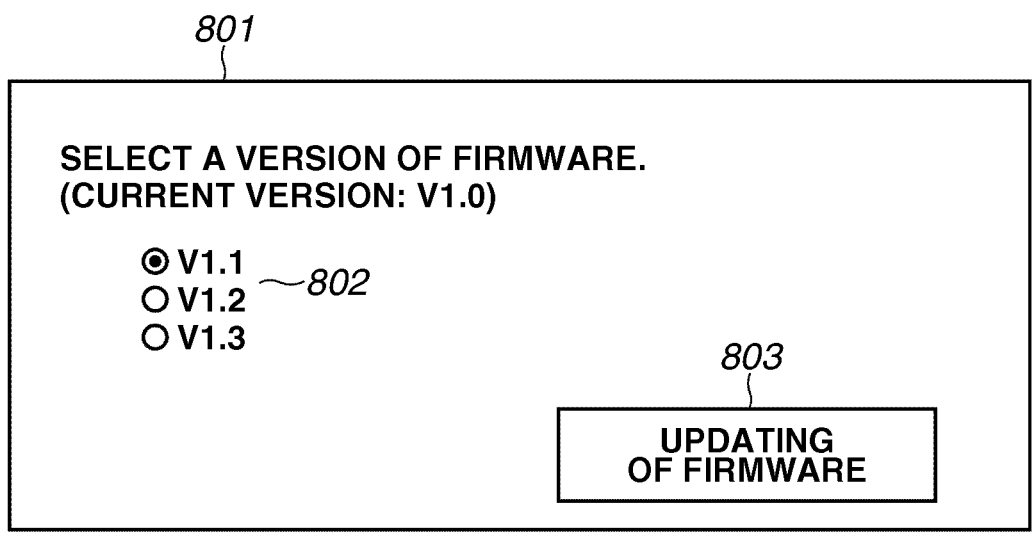
FIG. 8 illustrates an example of an update firmware selection screen for selecting the firmware to be updated.

FIG. 8 illustrates an example of an update firmware selection screen for selecting the firmware to be updated. When the firmware updating button 703 in FIG. 7 is clicked, the update firmware selection screen illustrated in FIG. 8 is displayed on the display unit 211.

An update firmware selection screen 801 is a screen on which the user selects the firmware to be updated.

A firmware selection radio button 802 includes a list of firmware selection radio buttons for displaying a list of pieces of updatable firmware.

A firmware update start button 803 is a button through which the user issues an instruction to start updating of the firmware.

Figure 9:
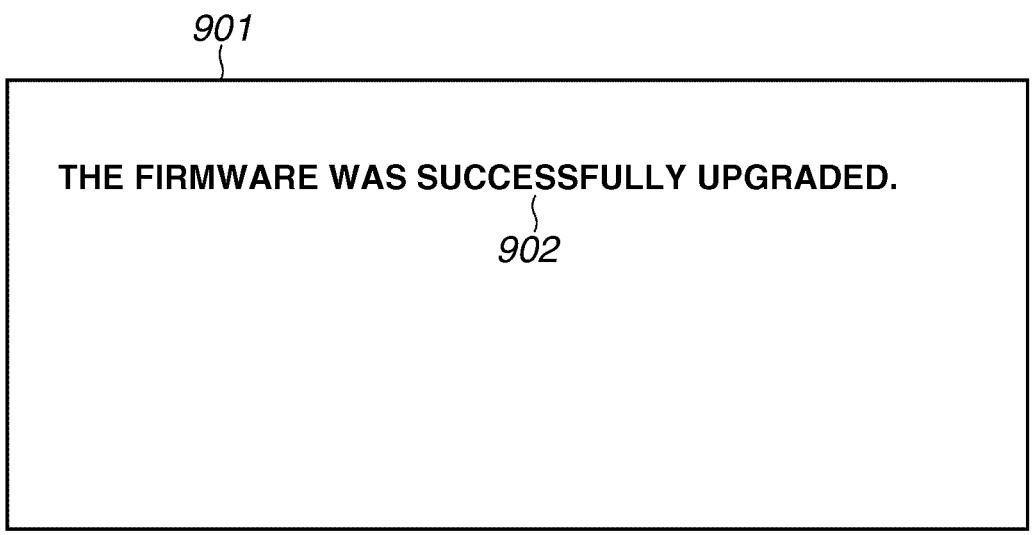
FIG. 9 illustrates an example of a firmware update result screen for displaying an update result of the firmware.

FIG. 9 illustrates an example of a firmware update result screen for displaying an update result of the firmware. When the firmware update start button 803 in FIG. 8 is clicked and the firmware is successfully updated (i.e., the firmware is upgraded), a firmware update result screen illustrated in FIG. 9 is displayed on the display unit 211.

A firmware update result screen 901 displays the update result of the firmware.

An update result label 902 indicates the update result of the firmware.

FIG. 10 illustrates an example of a distribution firmware table storing distributable firmware information the distribution server 101 stores.

A distribution firmware table 1001 stores firmware information as an example of the distributable program information the distribution server 101 stores.

A model column 1002 stores models to which the program is distributed.

A device number column 1003 describes device numbers belonging to the models to which the program is distributed. An example in FIG. 10 shows that device numbers AAA00000 through AAA999999 and device numbers BBB00000 through BBB99999 belong to a model C7065. More specifically, the device number column 1003 stores a group of device numbers including a plurality of device numbers of the devices belonging to the model to which the program is distributed. The group of device numbers is an example of a group of a plurality of pieces of device identification information.

A pre-update version column 1004 stores versions of the firmware before being updated.

A post-update version column 1005 stores versions of the firmware after being updated.

FIG. 11 illustrates an example of a distribution history table storing distribution histories the distribution server 101 stores.

A distribution history table 1101 stores distribution histories the distribution server 101 stores.

A distribution date and time column 1102 stores date and time when the firmware was distributed. A distribution device number column 1103 stores device numbers of the image forming apparatus 103 to which the firmware was distributed.

A model column 1104 stores models of the image forming apparatus 103 to which the firmware was distributed.

A pre-update version column 1105 stores versions of pre-update firmware of the image forming apparatus 103 to which the firmware was distributed.

An post-update version column 1106 stores versions of post-update firmware of the image forming apparatus 103 to which the firmware was distributed.

A result column 1107 stores results of distribution.

A document feeding unit column 1108 stores states of presence or absence of the document feeding unit 201 of the image forming apparatus 103 when the firmware was distributed.

A FAX board column 1109 stores states of presence or absence of the FAX board 212 of the image forming apparatus 103 when the firmware was distributed.

A hard disk column 1110 stores states of presence or absence of the hard disk 208 of the image forming apparatus 103 when the firmware was distributed.

An error column 1111 stores codes of errors having occurred in the image forming apparatus 103 when the firmware was distributed.

The present exemplary embodiment is described below with reference to a sequence diagram and flow charts illustrated in FIGS. 12 through 15.

FIG. 12 is a sequence diagram illustrating an example of processing in a case where the firmware is updated.

The present sequence is started when the firmware updating button 703 is clicked on the software management screen 701 displayed on the display unit 211 of the image forming apparatus 103.

In step 1201, the user clicks the firmware updating button 703 on the software management screen by using the operation unit 210 to thereby notify a start of the updating of the firmware to the image forming apparatus 103.

In step 1202, the image forming apparatus 103 transmits the device number and the current firmware version thereof to the distribution server 101 and requests the distribution server 101 to provide a distributable firmware list as an example of program data.

The distribution server 101 calculates, after receiving the request for the distributable firmware list in step 1202, an applicable firmware list and returns the applicable firmware list to the image forming apparatus 103 as a response in step 1205. Descriptions of steps 1203 and 1204 are made below with reference to FIG. 13. Similarly, a detailed description of a method for calculating the applicable firmware list is made below with reference to FIG. 13.

In step 1205, the image forming apparatus 103 displays, after receiving the applicable firmware list, the update firmware selection screen 801 on the display unit 211 and further displays the applicable firmware list in the form of the firmware selection radio button 802.

In step 1206, the user selects the firmware selection radio button 802 on the update firmware selection screen 801 displayed in step 1205 by using the operation unit 210 and clicks the firmware update start button 803.

In step 1207, the image forming apparatus 103 transmits the device number thereof and the selected firmware information to the distribution server 101 to request the distribution server 101 to provide the firmware.

In step 1208, the distribution server 101 returns the firmware, for which the request is received in step 1207, as a response.

In step 1209, the image forming apparatus 103 stores the firmware received in step 1210 in the hard disk 208 and updates the firmware.

In step 1210, the image forming apparatus 103 notifies the device number thereof and the update result of the firmware to the distribution server 101. The distribution server 101 updates the distribution history table based on the received firmware update result. This is an example of processing for storing the distribution history.

In step 1211, the distribution server 101 notifies completion of the distribution history registration to the image forming apparatus 103 as the result of the notification in step 1206. The image forming apparatus 103 displays the firmware update result screen 901 on the display unit 211 and further displays the update result of the firmware as the update result label 902.

Figure 13:
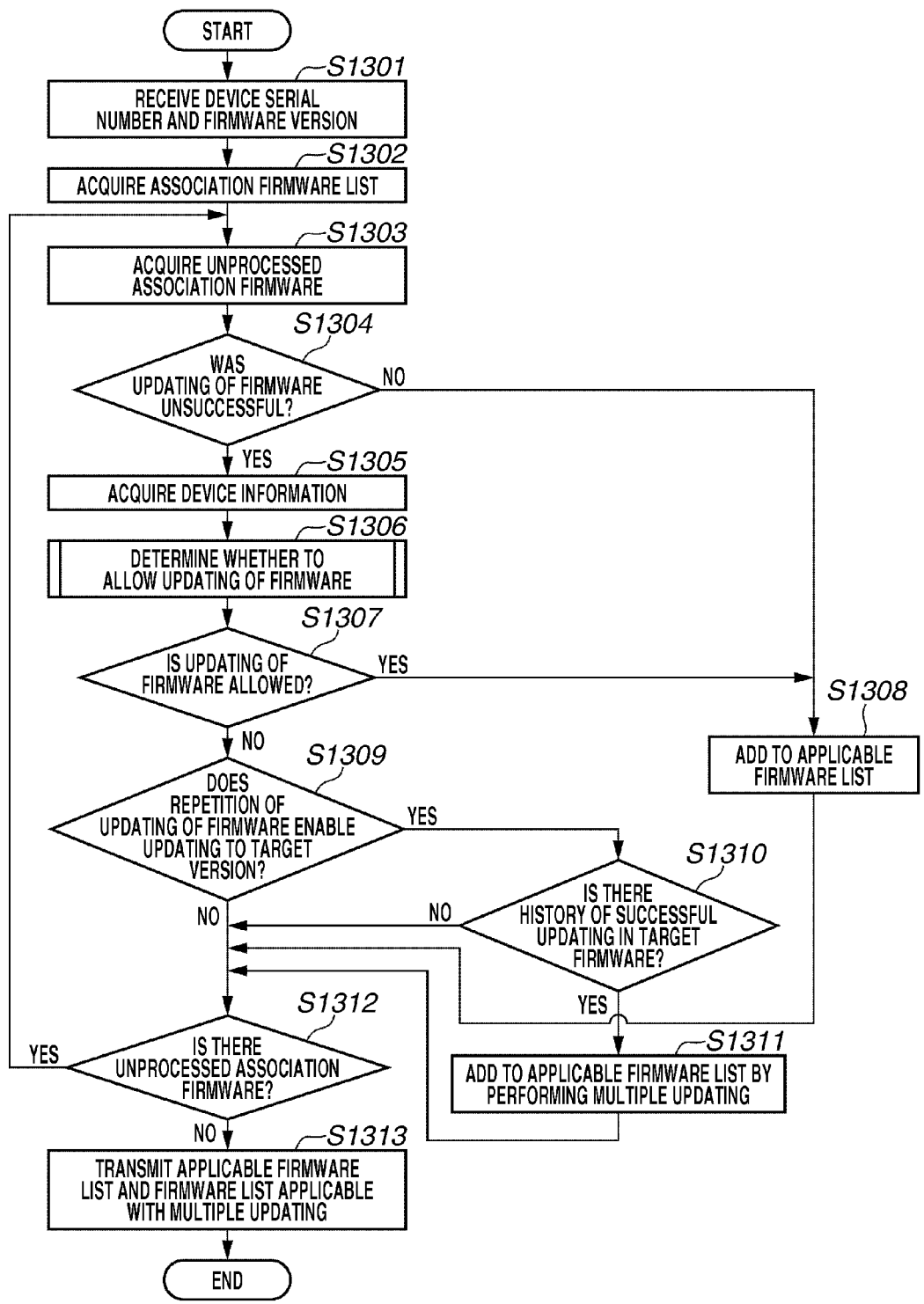
FIG. 13 is a flow chart illustrating an example of processing to be performed by the distribution server for the purpose of calculation of applicable firmware executed in step 1202 in FIG. 12.

FIG. 13 is a flow chart illustrating an example of processing that the distribution server 101 performs to calculate an applicable firmware to be executed in step 1202 of FIG. 12. This flow chart is executed when the request for the distributable firmware list in step 1202 is received.

In step S1301, the CPU 303 of the distribution server 101 acquires the device number and the current firmware version of the image forming apparatus 103 from the network I/F 306 via the Internet 104 to store the acquired device number and current firmware version in the memory 305.

In step S1302, the CPU 303 loads the distribution firmware table 1001 stored in the hard disk 304 to the memory 305. Then, the CPU 303 acquires an association firmware list as a list of records in which the device number and the firmware version acquired in step S1301 are contained in the device number column 1003 and the pre-update version column 1004, respectively.

In step S1303, the CPU 303 acquires an unprocessed record from the association firmware list acquired in step S1302. The processing in steps S1301 through S1303, is an example of processing for acquiring the program information.

In step S1304, the CPU 303 loads the distribution history table 1101 stored in the hard disk 304 to the memory 305. The CPU 303 acquires data of the model column 1002, the pre-update version column 1004, and the post-update version column 1005 of the record acquired in step S1303. Further, the CPU 303 acquires a list of records in which the acquired model, the pre-update version, and the post-update version match the model column 1104, the pre-update version column 1105, and the post-update version column 1106 of the distribution history table 1101, respectively. These processing operations are an example of processing for acquiring the distribution history. Then, the CPU 303 checks the result column 1107 of the acquired list of records. In a case where all the pieces of firmware are successfully updated (NO in step S1304), the processing proceeds to step S1308. In a case where even a single piece of firmware is not successfully updated (YES in step S1304), the processing proceeds to step S1305.

In step S1305, the CPU 303 makes a request for acquiring device information corresponding to the device number stored in the memory 305 to the device management server 102 from the network I/F 306 via the Internet 104 (step 1203 in FIG. 12). The device management server 102 acquires the hardware configuration of the device corresponding to the device number received as a result of the request of acquirement of the device information from the hardware configuration table 501 and the error information from the error information table 601, and returns the hardware configuration and the error information to the image forming apparatus 103 as a device information acquisition response (step 1204 in FIG. 12). Then, the CPU 303 of the distribution server 101 receives the device information acquisition response from the network I/F 306 via the Internet 104 and stores the hardware configuration and the error information in the memory 305. The processing in step S1305 is an example of processing for acquiring the device information.

In step S1306, the CPU 303 determines whether to allow updating of the firmware based on the hardware configuration and the error information acquired in step S1305 and the distribution history table 1101. The determination processing is described below with reference to the flow chart of FIG. 14. The processing in step S1306 is an example of the determination processing.

In step S1307, in a case where the CPU 303 allows the updating of the firmware as the result of step S1306 (YES in step S1307), the processing proceeds to step S1308, whereas, in a case where the CPU 303 does not allow the updating of the firmware as the result of step S1306 (NO in step S1307), the processing proceeds to step S1309.

In step S1308, the CPU 303 adds the record acquired in step S1303 to the memory 305 as an applicable firmware list. The processing in step S1308 is an example of the addition processing.

In step S1309, the CPU 303 searches whether there is a combination of records that finally becomes the post-update version of the firmware in step S1303 in the distribution firmware table 1001 loaded in the memory 305 in step S1302. In a case where the CPU 303 determines there is the combination of records (YES in step S1309), the processing proceeds to step S1310, whereas, in a case where the CPU 303 determines there is no combination of records (NO in step S1309), the processing proceeds to step S1312. The processing in step S1309 is an example of the search processing.

In step S1310, the CPU 303 confirms whether the combination of the records searched in step S1309 is stored in the distribution history table 1101 loaded to the memory 305 in step S1304 with the result of successful distribution history.

In a case where the CPU 303 determines the distribution history was successful (YES in step S1310), the processing proceeds to step S1311, whereas, in a case where the CPU 303 determines the distribution history was not successful (NO in step S1310), the processing proceeds to step S1312. The processing in step S1310 is an example of the determination processing.

In step S1311, the CPU 303 adds the combination of records searched in step S1309 to the memory 305 as the applicable firmware list by performing multiple updating. The processing in step S1311 is an example of the multiple-update addition processing. The applicable firmware list by performing the multiple updating is an example of multiple update program data. In step S1312, the CPU 303 checks whether there is an unprocessed record in the association firmware list acquired in step S1302. In a case where there still is the unprocessed record (YES in step S1312), the processing returns to step S1303, whereas, in a case where the CPU 303 has processed all the records (NO in step S1312), the processing proceeds to step S1313.

In step S1313, the CPU 303 transmits the applicable firmware list stored in the memory 305 and the firmware list applicable with the multiple updating to the image forming apparatus 103 from the network I/F 306 via the Internet 104. Then, the CPU 303 brings the processing illustrated in FIG. 13 to an end. The processing in step S1313 is an example of the response processing.

Figure 14:
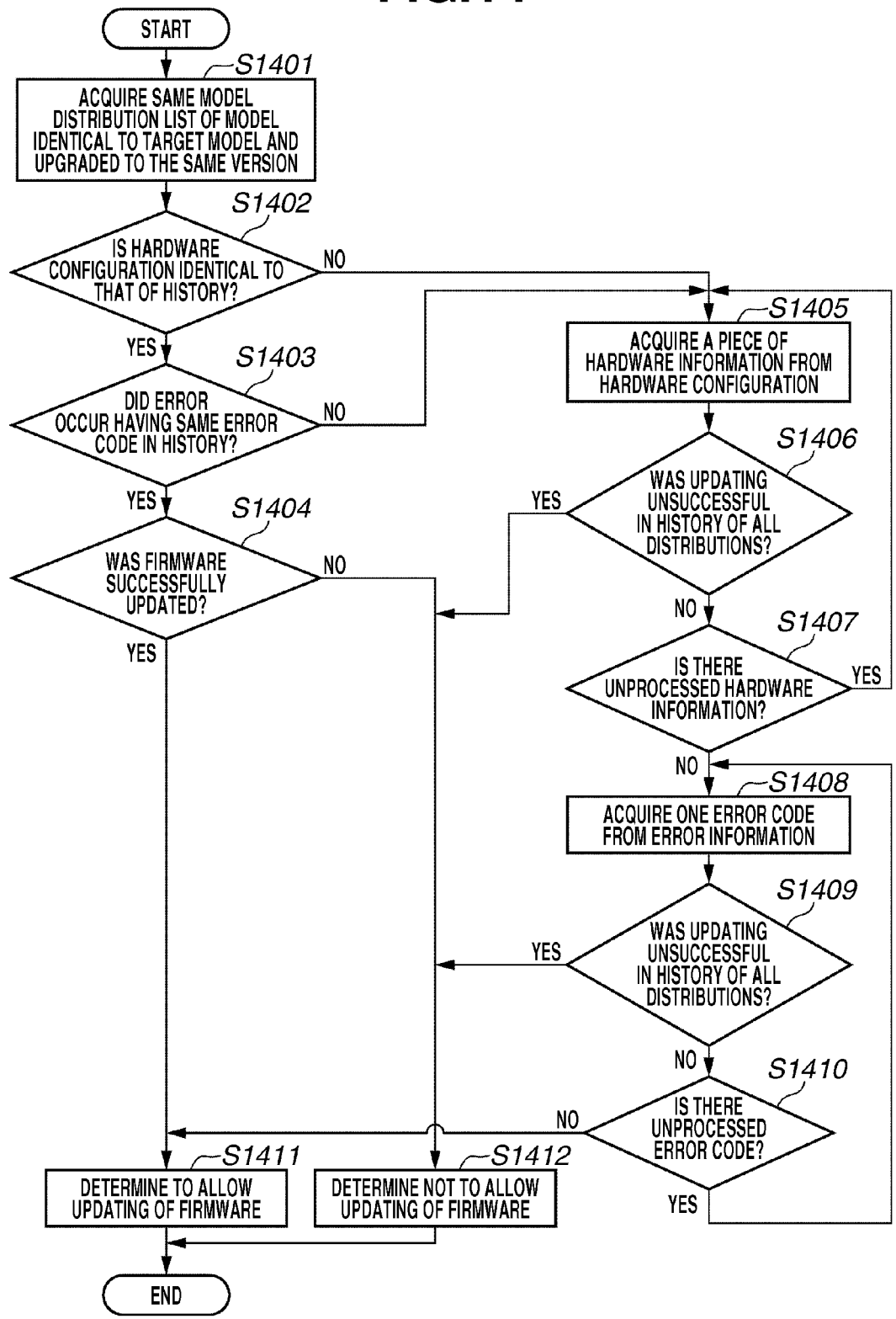
FIG. 14 is a flow chart illustrating an example of processing executed in step S1306 of FIG. 13 for determining whether to allow updating of the firmware.

FIG. 14 is a flow chart illustrating an example of the processing executed in step S1306 of FIG. 13 for determining whether to allow the updating of the firmware.

In step S1401, the CPU 303 searches the record of the distribution history of the model corresponding to the device number received in step S1301 and of the version identical to the pre-update version and the post-update version acquired in step S1303 from the distribution history table to set the searched record to the same model distribution history list.

In step S1402, the CPU 303 checks whether there is the image forming apparatus having the configuration identical to the hardware configuration acquired in step S1305 in the same model distribution history list acquired in step S1401. In a case where the CPU 303 determines there is the above-described image forming apparatus (YES in step S1402), the processing proceeds to step S1403, whereas, in a case where the CPU 303 determines there is no above-described image forming apparatus (NO in step S1402), the processing proceeds to step S1405.

In step S1403, the CPU 303 checks, in the same model distribution history list, whether all the errors acquired in step S1305 occurred in the image forming apparatus found in step S1402. In a case where the CPU 303 determines all the errors occurred (YES in step S1403), the processing proceeds to step S1404, whereas, in a case where the CPU 303 determines not all the errors occurred (NO in step S1403), the processing proceeds to step S1405.

In step S1404, the CPU 303 confirms the distribution history in the image forming apparatus found in step S1403 in the same model distribution list. In a case where the CPU 303 determines the firmware is successfully updated (YES in step S1404), the processing proceeds to step S1411, whereas, in a case where the CPU 303 determines the firmware is not successfully updated (NO in step S1404), the processing proceeds to step S1412.

In step S1405, the CPU 303 acquires a piece of unprocessed hardware information from the hardware configuration acquired in step S1305. For example, the CPU 303 acquires the unprocessed hardware information (e.g., "a document feeding unit") in a case where the hardware configuration includes hardware information of, for example, the document feeding unit, the FAX board, and the hard disk.

In step S1406, the CPU 303 searches the distribution history including the hardware information identical to that acquired in step S1405 from the same model distribution list to confirm whether the updating was unsuccessful in history of all the distributions. In a case where the CPU 303 determines updating was unsuccessful in history of all the distributions (YES in step S1406), the processing proceeds to step S1412, whereas, in a case where the CPU 303 determines updating was successful in history of even one distribution (NO in step S1406), the processing proceeds to step S1407.

In step S1407, the CPU 303 checks whether there is unprocessed hardware information. In a case where the CPU 303 determines there is the unprocessed hardware information (YES in step S1407), the processing returns to step S1405, whereas, in a case where the CPU 303 determines there is no unprocessed hardware information (NO in step S1407), the processing proceeds to step S1408.

In step S1408, the CPU 303 acquires one error code of the unprocessed error information from the error information acquired in step S1305.

In step S1409, the CPU 303 searches the distribution history having the error code identical to that acquired in step S1408 from the same model distribution list and confirms whether the updating was unsuccessful in the history of all distributions. In a case where the CPU 303 determines the updating was unsuccessful in the history of all distributions (YES in step S1409), the processing proceeds to step S1412, whereas, in a case where the CPU 303 determines the updating was successful in the history of even one distribution (NO in step S1409), the processing proceeds to step S1410

In step S1410, the CPU 303 checks whether there is the error code of the unprocessed error information. In a case where the CPU 303 determines there is the error code of the unprocessed error information (YES in step S1410), the processing returns to step S1408, whereas in a case where the CPU 303 determines there is no error code of the unprocessed error information (NO in step S1410), the processing proceeds to step S1411.

In step S1411, the CPU 303 returns a result to allow the updating with a combination of the pre-update version and the post-update version acquired in step S1303 and ends the processing illustrated in FIG. 14.

In step S1412, the CPU 303 returns a result not to allow the updating with a combination of the pre-update version and the post-update version acquired in step S1303 and ends the processing illustrated in FIG. 14.

Assumption is made such that there are only limited device numbers on the network. In this case, the CPU 303 can skip the processing for acquiring the device information in step S1305 of FIG. 13.

A predetermined constant (e.g., a unique number defined for each client) can be input into each of the devices at the factory as the device number of the distribution history table, or the device numbers can be omitted. In other words, the CPU 303 can skip the processing in step S1401, thereby executing the processing in and after step S1402.

In the present exemplary embodiment, the firmware is described as an example of a control program of the pre-update version. Also, in the present exemplary embodiment, the image forming apparatus 103 is described as an example of the device that is operated under control of this firmware. Further, in the present exemplary embodiment, the distribution server 101 is described as an example of the distribution apparatus that communicates with the image forming apparatus 103. The distribution server 101 transmits the firmware of the post-update version to the image forming apparatus 103. At the time, the distribution server 101 transmits the firmware to the image forming apparatus 103 via the network interface. The distribution server 101 receives from the image forming apparatus 103 the device information acquisition response as an example of the distribution history containing information indicating whether the updating of the firmware from the pre-update version to the post-update version was successful. The device information acquisition response includes a record of the distribution history having the version identical to the pre-update version and the post-update version. Accordingly, the distribution server 101 determines whether the firmware was successfully updated from the pre-update version to the post-update version.

In a case where the record of the distribution history shows that the updating of the firmware from the pre-update version to the post-update version was not successful, the distribution server 101 may execute the following processing. More specifically, the distribution server 101 may form the applicable firmware list as an example of information for forming display information of the user interface that limits updating of the firmware from the pre-update version to the post-update version in the operation unit of the image forming apparatus 103 or the display unit of the distribution server 101 (S1405). In a case where the post-update version is not included in the applicable firmware list, the updating of the firmware from the pre-update version to the post-update version comes to be limited by the user interface of, for example, the image forming apparatus 103. The display information may include not only the applicable firmware list but also information indicating that the updating of the firmware from the pre-update version to the post-update version is limited and the reasons thereof.

FIG. 15 is a flow chart illustrating an example of the processing performed by the image forming apparatus 103 when the image forming apparatus 103 receives the response in step 1205 of FIG. 12.

In step S1501, the CPU 207 of the image forming apparatus 103 receives the applicable firmware list and the firmware list applicable with multiple updating returned in step S1313 from the network I/F 205 via the Internet 104.

In step S1502, the CPU 207 generates the update firmware selection screen 801 and stores the generated screen in the memory 209.

In step S1503, the CPU 207 adds the applicable firmware of the post-update version acquired in step S1501 as the firmware selection radio button 802 of the update firmware selection screen 801 generated in step S1502.

In step S1504, the CPU 207 adds the firmware of the post-update version applicable with multiple updating acquired in step S1501 as the firmware selection radio button 802 of the update firmware selection screen 801 generated in step S1502.

At that time, the CPU 207 adds a sentence of a notice that the firmware is upgraded for a plurality of times with respect to the firmware selection radio button 802.

In step S1505, the CPU 207 displays the update firmware selection screen 801 on the display unit 211.

As described above, according to the present exemplary embodiment, a device determined to be incapable of updating software is excluded from targets for software updating, thus preventing a distribution of software with a combination in which the updating of software may not be successful. Further, avoiding a combination of firmware in which the updating of software may become unsuccessful and updating the software for a plurality of times to set the software to a target version enable a more suitable software distribution.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-108634 filed May 10, 2010, which is hereby incorporated by reference herein in its entirety.

What is claimed is:

1. A distribution apparatus comprising at least a processor, functioning as:
    a holding unit configured to hold, in a storage device, association information associating model information for identifying a model of a device, device identification information for identifying the device, a pre-update version of a program distributable to the device, and a post-update version of the program distributable to the device;
    a history storage unit configured to store, in the storage device as a distribution history, the device identification information of the device to which a program was distributed, the pre-update version of the program of the device, a version of the distributed program as the post-update version, and an update result indicating whether updating with the distributed program in the device was successful;
    an identification unit configured to identify, from the storage device, when a request about a program applicable to the device and including the device identification information and the version of the program of the device is received from the device, association information corresponding to the device identification information and the version of the program included in the request;
    a search unit configured to search, based on the device identification information, the pre-update version, and the post-update version included in the identified association information from the storage device, a combination of multiple updating for enabling updating to the program of the post-update version by repetition of updating;
    a history identification unit configured to identify a plurality of different distribution histories corresponding to each the multiple updating included in the searched combination by the search unit; and
    a response unit configured to transmit, when the update result indicates successful updating in the identified distribution histories, information indicating the post-update versions included in the distribution histories to the device as a response to the request.

2. The distribution apparatus according to claim 1, wherein the history storage unit stores, in the storage device, a hardware configuration of the device acquired and error information of an error having occurred when the program was distributed as the distribution history in addition to the device identification information, the pre-update version, the post-update version, and the update result, wherein the distribution apparatus further comprises:

an acquisition unit configured to acquire, when the update result indicates unsuccessful updating in the identified distribution histories, the hardware configuration and error information of the device identified by the device identification information from a device management device for managing information of a plurality of devices based on the device identification information included in the request; and a determination unit configured to determine whether to allow updating with the program of the post-update version included in the distribution history with respect to the device by comparing the acquired hardware configuration and error information of the device with the hardware configuration and error information in the identified distribution histories, and wherein the response unit transmits information indicating the post-update versions included in the distribution history as the response to the request when the determination unit determines to allow the updating.

3. The distribution apparatus according to claim 1, wherein the response unit further transmits a notice that the program is upgraded for a plurality of times as the response to the request.

4. A method for a distribution apparatus, the method comprising:

holding, in a storage device, using a processor, association information associating model information for identifying a model of a device, device identification information for identifying the device, a pre-update version of a program distributable to the device, and a post-update version of a program distributable to the device;

storing, in the storage device as a distribution history, using the processor, the device identification information of the device to which the program was distributed, the pre-update version of the program of the device, a version of the distributed program as the post-update version, and an update result indicating whether updating with the distributed program in the device was successful;

identifying, from the storage device, using the processor, when a request about a program applicable to the device and including the device identification information and the version of the program of the device is received from the device, association information corresponding to the device identification information and the version of the program included in the request;

searching, based on the device identification information, using the processor, the pre-update version, and the post-update version included in the identified association information from the storage device, a combination of multiple updating for enabling updating to the program of the post-update version by repetition of updating;

identifying, using the processor, a plurality of different distribution histories corresponding to each the multiple updating included in the searched combination by the searching step; and transmitting, using the processor, when the update result indicates successful updating in the identified distribution histories, information indicating the post-update versions included in the distribution histories to the device as a response to the request.

5. A computer-readable storage medium storing a computer program for causing a computer to execute a method for a distribution apparatus, the method comprising:

holding, in a storage device, association information associating model information for identifying a model of a device, device identification information for identifying the device, a pre-update version of a program distributable to the device, and a post-update version of a program distributable to the device;

storing, in the storage device as a distribution history, the device identification information of the device to which a program was distributed, the pre-update version of the program of the device, a version of the distributed program as the post-update version, and an update result indicating whether the updating with the distributed program in the device was successful;

identifying, from the storage device, when a request about a program applicable to the device and including the device identification information and the version of the program of the device is received from the device, association information corresponding to the device identification information and the version of the program included in the request;

searching, based on the device identification information, the pre-update version, and the post-update version included in the identified association information from the storage device, a combination of multiple updating for enabling updating to the program of the post-update version by repetition of updating;

identifying a plurality of different distribution histories corresponding to each the multiple updating included in the searched combination by the searching step; and transmitting, when the update result indicates successful updating in the identified distribution histories, information indicating the post-update versions included in the distribution histories to the device as a response to the request.

6. A program distribution system including a distribution apparatus and a plurality of devices, wherein the distribution apparatus comprises at least a processor, functioning as:

a holding unit configured to hold, in a storage device, association information associating model information for identifying a model of a device, device identification information for identifying the device, a pre-update version of a program distributable to the device, and a post-update version of a program distributable to the device;

a history storage unit configured to store, in the storage device as a distribution history, the device identification information of the device to which a program was distributed, the pre-update version of the program of the device, a version of the distributed program as the post-update version, and an update result indicating whether the updating with the distributed program in the device was successful;

an identification unit configured to identify, from the storage device, when a request about a program applicable to the device and including the device identification information and the version of the program of the device is received from the device, association information corresponding to the device identification information and the version of the program included in the request;

a search unit configured to search, based on the device identification information, the pre-update version, and the post-update version included in the identified association information from the storage device, a combination of multiple updating for enabling updating to the program of the post-update version by repetition of updating;

a history identification unit configured to identify a plurality of different distribution histories corresponding to each the multiple updating included in the searched combination by the search unit; and a response unit configured to transmit, when the update result indicates successful updating in the identified distribution histories, information indicating the post-update versions included in the distribution histories to the device as a response to the request, wherein each of the plurality of devices comprises:

a transmission unit configured to transmit the request to the distribution apparatus according to an instruction for updating the program via a screen of the device; and a display unit configured to display information indicating the post-update version of the program received from the distribution apparatus as the response to the request on the screen of the device.

* * * * *